US 9,506,677 B2

(12) United States Patent
Lv et al.

(10) Patent No.: US 9,506,677 B2
(45) Date of Patent: Nov. 29, 2016

(54) ELECTRONIC EXPANSION VALVE (75) Inventors: Ming Lv, Zhejiang Province (CN); Ze Yuan, Zhejiang Province (CN)

(73) Assignee: Zhejiang Sanhua Co., Ltd., Zhejiang (CN)

(*) Notice: Subject to any disclaimer, the term of this patent is extended or adjusted under 35 U.S.C. 154(b) by 179 days.

(21) Appl. No.: 14/124,223

(22) PCT Filed: Jun. 26, 2012

(86) PCT No.: PCT/CN2012/077508
§ 371 (c)(1),
(2), (4) Date: Dec. 5, 2013

(87) PCT Pub. No.: WO2013/000390
PCT Pub. Date: Jan. 3, 2013

(65) Prior Publication Data
US 2014/0091246 A1   Apr. 3, 2014

(30) Foreign Application Priority Data

Jun. 27, 2011 (CN) .......................... 2011 1 0175336

(51) Int. Cl.
F16K 31/04 (2006.01)
F16K 31/50 (2006.01)
F25B 41/06 (2006.01)

(52) U.S. Cl.
CPC .............. *F25B 41/062* (2013.01); *F16K 31/04* (2013.01); *F16K 31/047* (2013.01); *F16K 31/508* (2013.01); *F25B 2341/0653* (2013.01); *Y02B 30/72* (2013.01)

(58) Field of Classification Search
CPC ...... F16K 31/04; F16K 31/047; F16K 31/50; F16K 31/508; F25B 41/062; F25B 2341/0653
USPC .................................................... 251/129.11
See application file for complete search history.

(56) References Cited

U.S. PATENT DOCUMENTS 601,967 A * 4/1898 Jones ........................... 251/266
3,533,598 A   10/1970 Tillman
(Continued)

FOREIGN PATENT DOCUMENTS

CN   85103856 A   5/1987
CN   2703169 Y    6/2005
(Continued)

OTHER PUBLICATIONS

Extended European Search Report and European Search Opinion dated Mar. 3, 2015 from corresponding European Application No. 1280378.
(Continued)

*Primary Examiner* — Marina Tietjen
*Assistant Examiner* — Seth W MacKay-Smith
(74) *Attorney, Agent, or Firm* — Wolf, Greenfield & Sacks, P.C.

(57) ABSTRACT

An electronic expansion valve comprising a screw rod and a motor provided with an output shaft. The output shaft is transmissively connected to the screw rod via a gear system. The gear system is supported on a gear base. The screw rod passes through the gear base. The electronic expansion valve also comprises a valve base provided with valve cavity and a motor housing arranged on the exterior of the motor. The gear base is further arranged within the valve cavity. The upper end part of the valve base is further connected to the lower end part of the motor housing. The structural design of the electronic expansion valve reduces the number of sealed parts for same, thus effectively lowering the probability of leakage and simplifying the assembly structure thereof.

7 Claims, 10 Drawing Sheets (56) References Cited

U.S. PATENT DOCUMENTS

| | | | |
|---|---|---|---|
| 4,436,279 A | | 3/1984 | Bonds et al. |
| 4,556,193 A | | 12/1985 | Yoshiga |
| 4,593,881 A | * | 6/1986 | Yoshino ................. 251/124 |
| 4,754,949 A | * | 7/1988 | Fukamachi ............ 251/129.03 |
| 5,318,064 A | | 6/1994 | Reinicke |
| 5,364,066 A | * | 11/1994 | Dorste et al. ............... 251/122 |
| 5,402,652 A | * | 4/1995 | Alsenz ...................... 62/222 |
| 5,735,501 A | | 4/1998 | Maurer et al. |
| 6,257,271 B1 | * | 7/2001 | Babin et al. .............. 137/315.17 |
| 6,568,656 B1 | | 5/2003 | Wrocklage |
| 7,240,694 B2 | * | 7/2007 | Johnsen et al. .......... 137/630.15 |
| 8,327,883 B2 | * | 12/2012 | Kannoo ................... 137/625.43 |
| 8,333,363 B2 | * | 12/2012 | Nalini et al. ............ 251/129.11 |
| 8,960,637 B2 | * | 2/2015 | Parker et al. ............ 251/129.11 |
| 2006/0005890 A1 | | 1/2006 | Johnsen et al. |
| 2011/0084224 A1 | | 4/2011 | Zhan et al. |

FOREIGN PATENT DOCUMENTS

| | | |
|---|---|---|
| CN | 2735101 Y | 10/2005 |
| CN | 2775430 Y | 4/2006 |
| CN | 2823701 Y | 10/2006 |
| CN | 1985118 A | 6/2007 |
| CN | 200580023202.7 | 6/2007 |
| CN | 201013922 Y | 1/2008 |
| CN | 201265694 Y | 7/2009 |
| CN | 101749467 A | 6/2010 |
| CN | 101858455 A | 10/2010 |
| CN | 201706059 U | 1/2011 |
| CN | 102032380 A | 4/2011 |
| CN | 202109047 U | 1/2012 |
| CN | 202149257 U | 2/2012 |
| EP | 2284461 A1 | 2/2011 |
| JP | H 0245104 B2 | 10/1990 |
| JP | H 06174131 A | 6/1994 |
| JP | 8004931 A | 1/1996 |
| JP | 8-303638 A | 11/1996 |
| JP | H 10132124 A | 5/1998 |
| JP | 2000346227 A | 12/2000 |
| JP | 2001295957 A | 10/2001 |
| JP | 2002089731 A | 3/2002 |
| JP | 2002147901 A | 5/2002 |
| JP | 2002310541 A | 10/2002 |
| JP | 2006307975 A | 11/2006 |
| JP | 2008505293 A | 2/2008 |
| JP | 2009140986 A | 6/2009 |
| JP | 2009287769 A | 12/2009 |
| KR | 20080098725 A | 11/2008 |
| KR | 20090123573 A | 12/2009 |
| KR | 100944762 B | 3/2010 |
| SU | 1555583 A1 | 4/1990 |

OTHER PUBLICATIONS

First Japanese Office Action dated Feb. 10, 2015 from corresponding Japanese Application No. 2014-516181.
International Search Report dated Sep. 27, 2012 from corresponding International Application No. PCT/CN2012/077508.
International Search Report dated Oct. 4, 2012 from potentially related International Application No. PCT/CN2012/077522.
International Search Report dated Oct. 4, 2012 from potentially related International Application PCT/CN2012/077519.
International Search Report dated Oct. 4, 2012 from potentially related International Application No. PCT/CN2012/077516.

* cited by examiner

ELECTRONIC EXPANSION VALVE

The present application is the national phase of International Application No. PCT/CN2012/077508 filed on Jun. 26, 2012, which claims priority to Chinese Patent Application No. 201110175336.8, filed with the Chinese Patent Office on Jun. 27, 2011 and entitled "ELECTRONIC EXPANSION VALVE", which is herein incorporated by reference in its entirety.

FIELD OF THE INVENTION

The invention relates to the technical field of fluid control components, and particularly relates to an electronic expansion valve.

BACKGROUND OF THE INVENTION

An electronic expansion valve is an important component forming a refrigeration system, and is a fundamental component in the refrigeration system, besides an evaporator, a compressor and a condenser. Operating process of the electronic expansion valve is generally as follows: with energizing and de-energizing of a coil device, open degree of a valve opening is adjusted by a valve needle, so as to adjust the flow of refrigerant.

Figure 1:
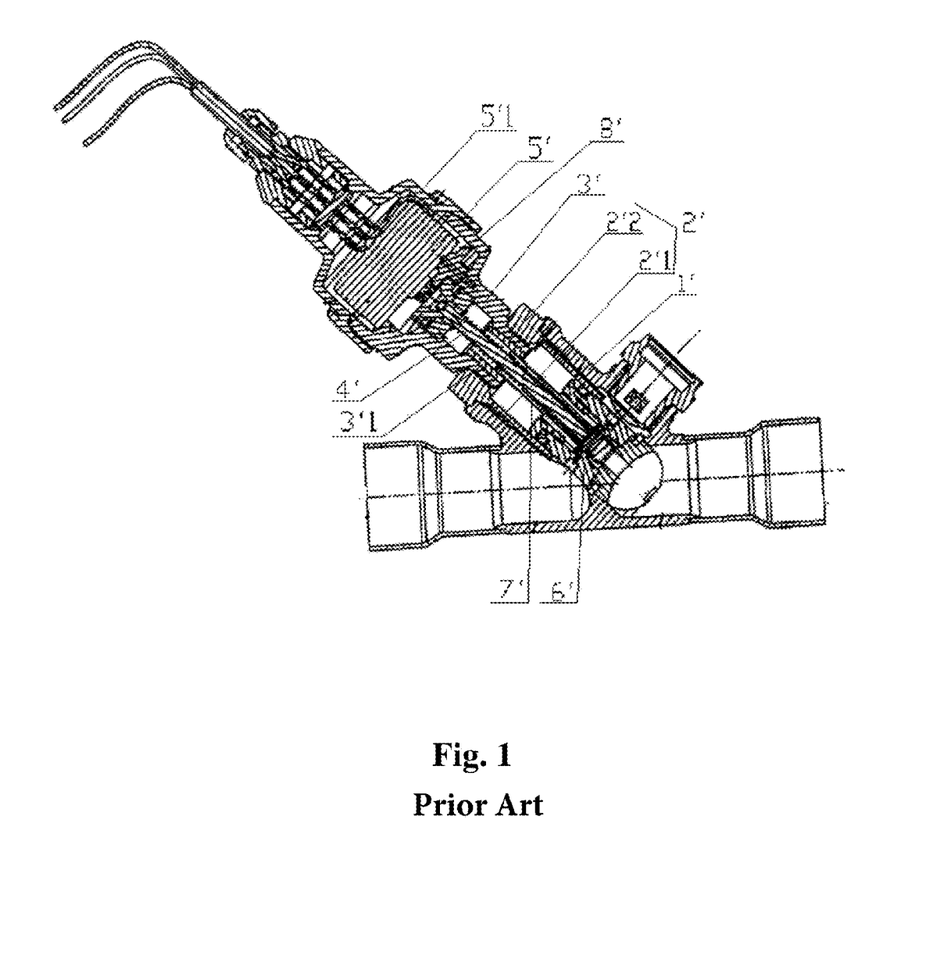
FIG. 1 is a structural schematic view of an electronic expansion valve in the prior art.

In the prior art, an electronic expansion valve is disclosed in the Chinese Patent No. 200580023202.7. Referring to FIG. 1, it is a structural schematic view of an electronic expansion valve in the prior art.

As shown in FIG. 1, the electronic expansion valve in the prior art includes a valve seat 1'. A sleeve part 2' is provided inside the valve seat 1' and includes a guiding part 2'1 and a head 2'2. A gear seat 3' is hermetically supported by the head 2'2. A gear system 8' is provided in the gear seat 3'. The gear system 8' is transmissively connected to a rod screw 4'. As shown in FIG. 1, an upper end of the gear seat 3' is further hermetically connected to a motor shell 5'1, inside of which a motor 5' is provided. The motor 5' is transmissively connected to the gear system 8' via an output shaft. A slidable valve rod 6' is provided inside the guiding part 2'1. A nut 7' extends from an upper end of the valve rod 6' and is further provided in a limit part 3'1 in a lower cavity of the gear seat 3'. Due to the limit action of the limit part 3'1, the nut 7' can axially slide in the limit part 3'1, and cannot circumferentially rotate.

In operation, the motor 5' is started, and its output shaft is rotated. The rotation motion is thus transmitted to the screw rod 4' via the gear system 8'. Since the screw rod 4' extends into the nut 7' via thread engagement, and the nut 7' only can axially slide in the limit part 3'1 and cannot rotate circumferentially, the nut 7' can slide axially as the screw rod 4' rotates, and then the nut 7'drives the valve rod 6' to axially slide in the guiding part 2'1, so as to adjust the open degree of the valve opening.

However, the above electronic expansion valve in the prior art has disadvantages as follows.

Firstly, the upper end of the gear seat 3' is hermetically connected to the motor shell 5'1 via thread engagement, and the lower end of the gear seat 3' is hermetically connected to the head 2'2 of the sleeve part 2' via thread engagement. Therefore, there are two sealed parts. The more the number of the sealed parts is, the higher the leakage probability is. Besides, the assembly structure is complicated.

Secondly, the nut 7' extends from the upper end of the valve rod 6', and is engaged with the limit part 3'1 such as to limit the circumferential rotation of the valve rod 6'. However, since the nut 7' has to extend from the upper end of the valve rod 6', the overall valve core component has a larger axial dimension, which causes a larger axial dimension of the valve body. Furthermore, since the outer diameter of the nut 7' is significantly less than that of the valve rod 6', the overall valve core component has a large lower portion and a small upper portion. Therefore, in manufacturing process of components, the inner diameter of the head 2'2 of the sleeve part 2' is less than that of the guiding part 2'1, and the outer diameter of the lower end of the gear seat 3' has to be reduced, so that the limit part 3'1 with a smaller inner diameter can be mounted in an inner cavity of the gear seat 3'. It can thus be known that the sleeve part 2' and the gear seat 3' each have a complicated structure, which causes difficult processing and high manufacturing cost. Also, since the valve core component formed of the nut 7' and the valve rod 6' has a large lower portion and a small upper portion, the assembling process of the nut 7', the valve rod 6', the gear seat 3', the sleeve part 2' and the valve seat 1' is complicated and difficult.

Therefore, it becomes an urgent problem to be addressed by the person skilled in the art to improve the electronic expansion valve in the prior art, so as to reduce leakage probability thereof and simplify assembly structure thereof.

SUMMARY OF THE INVENTION

The technical problem to be addressed by the invention is to provide an electronic expansion valve. The structure of the electronic expansion valve is designed such as to reduce the number of sealed parts, thereby effectively reducing the leakage probability and simplifying the assembly structure.

In order to solve the above technical problem, there is provided in the invention an electronic expansion valve, including a screw rod, and a motor provided with an output shaft. The output shaft is transmissively connected to the screw rod via a gear system. The gear system is supported on a gear seat, and the screw rod extends through the gear seat. The electronic expansion valve further includes a valve seat provided with a valve cavity, and a motor shell provided outside the motor. The gear seat is further provided in the valve cavity, and an upper end of the valve seat is further connected to a lower end of the motor shell.

Preferably, the valve seat includes a seat body, and a sleeve provided on an upper end of the seat body. An upper end of the sleeve is further connected to the lower end of the motor shell, and the gear seat is further provided inside the sleeve.

Preferably, the sleeve includes a sleeve body part, and a sleeve bending part bending towards outside. The sleeve body part is connected to the seat body, and the sleeve bending part is connected to the lower end of the motor shell. The gear seat is circumferentially provided with a connecting part, and the connecting part is connected to a circumferential inner wall of the sleeve body part.

Preferably, a supporting part with a smaller outer diameter is further provided above the connecting part, and the gear system is supported on the supporting part.

Preferably, the gear system includes a first gear connected to the output shaft, a second gear connected to the screw rod, and a transmission gear for transmitting motion of the first gear to the second gear. The transmission gear is provided with a positioning shaft, and a lower end of the positioning shaft is further connected to the supporting part.

Preferably, the supporting part is provided with a protruding part radially protruding out of a circumferential side surface of the supporting part, and the lower end of the positioning shaft is further connected to the protruding part.

Preferably, a lower end face of the gear seat is further supported on an upper end face of the seat body.

Preferably, the screw rod extends through the gear seat and is connected to a valve rod. One of the gear seat and the valve rod is provided with a limit recess, and the other one is provided with a limit protruding part axially slidable in the limit recess. The limit protruding part is provided in the limit recess so as to limit a position of the valve rod relative to the gear seat in a circumferential direction.

Preferably, the limit protruding part is a first limit rod member that is axially provided on one of the gear seat and the valve rod, and the limit recess is a first limit hole that is axially provided in the other one of the gear seat and the valve rod. The first limit rod member is provided in such a manner as to be slidable axially in the first limit hole.

Preferably, the gear seat is provided with a lower cavity, into which an upper end of the valve rod extends. The limit protruding part is a second limit rod member that is radially provided on one of a side wall of the lower cavity and a side wall of the valve rod, and the limit recess is a second limit hole that is radially provided in the other one of the side wall of the lower cavity and the side wall of the valve rod.

Preferably, the gear seat is provided with multiple positioning rod members extending axially. A lower cavity is circumferentially surrounded by the positioning rod members, and the upper end of the valve rod extends into the lower cavity. The limit protruding part is a second limit rod member provided on the side wall of the valve rod. Among the positioning rod members, a gap between at least one group of adjacent positioning rod members serves as a limit gap, and the limit recess is formed by the limit gap. The second limit rod member is inserted in the limit gap.

Based on the above prior art, the gear seat in the invention is provided in a valve cavity, and an upper end of the valve seat is further connected with a lower end of the motor shell. Specifically, the upper end of the valve seat needs to be hermetically connected to the lower end of the motor shell. Compared with the prior art, since the gear seat is further provided in the inner cavity of the valve seat and the upper end of the valve seat is hermetically connected to the lower end of the motor shell, there is one sealed part in such a structure. The less the number of the sealed parts is, the lower the leakage probability is. Furthermore, in the invention, since the gear seat is provided in the valve cavity, and the upper end of the valve seat is connected to the lower end of the motor shell, the assembly structure is simplified as compared with the prior art.

To sum up, in the electronic expansion valve according to the invention, the number of the sealed parts is reduced, and thus leakage probability of the electronic expansion valve can be effectively reduced and the assembly structure thereof can be simplified.

BRIEF DESCRIPTION OF THE DRAWINGS

FIG. 8-1 is a sectional view of an assembly structure of the gear seat and the valve rod in FIG. 8;

FIG. 8-2 is a structural schematic view of the gear seat in FIG. 8;

FIG. 8-3 is a structural schematic view of the valve rod in FIG. 8;

FIG. 9-1 is a structural schematic view of a gear seat in a further embodiment of the invention;

FIG. 9-2 is a structural schematic view of a valve rod fitted with the gear seat in FIG. 9-1;

FIG. 10-1 is a structural schematic view of a gear seat in a still further embodiment of the invention; and FIG. 10-2 is a structural schematic view of an electronic expansion valve including the gear seat in FIG. 10-1.

Reference numerals in FIG. 1:
1' valve seat; 2' sleeve part; 2'1 guiding part; 2'2 head; 3' gear seat; 4' screw rod; 5' motor; 5'1 motor shell; 6' valve rod; 7' nut; and 8' gear system.

Reference numerals in FIGS. 2 to 10-2:
1 screw rod; 2 motor; 21 output shaft; 22 motor shell;
3 gear seat; 31 connecting part; 32 supporting part; 321 protruding part; 33 step; 34 first limit rod member; 35 second limit hole; 36 lower cavity; 361 interrupted part; 362 positioning rod member; 363 limit gap; 38 non-circular irregular groove; 39 positioning hole;
4 valve seat; 41 seat body; 42 sleeve; 421 sleeve body part; 422 sleeve bending part;
51 first gear; 52 second gear; 53 transmission gear; 54 positioning shaft;
6 valve rod; 61 first limit hole; 62 second limit rod member; 63 nut; 63 non-circular irregular part.

DETAILED DESCRIPTION OF THE INVENTION

An object of the invention is to provide an electronic expansion vale. The structure of the electronic expansion valve is designed such as to reduce the number of sealed parts, thus effectively reducing leakage probability of the electronic expansion valve and simplifying the assembly structure of the electronic expansion valve.

In order to make those skilled in the art better understand the technical solutions of the invention, the invention is further described in detail hereinafter in conjunction with the drawings and specific embodiments.

Figure 2:
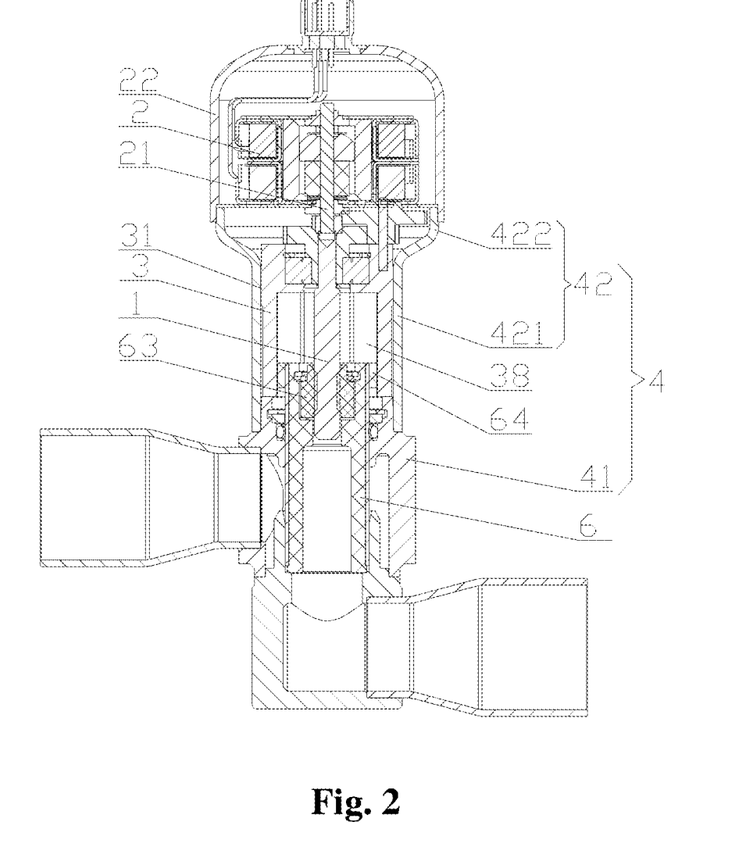
FIG. 2 is a structural schematic view of an electronic expansion valve in an embodiment of the invention.

Referring to FIG. 2, it is a structural schematic view of an electronic expansion valve in an embodiment of the invention.

In an embodiment, an electronic expansion valve according to the invention is used to adjust flow of a refrigerant. As shown in FIG. 2, the electronic expansion valve includes a motor shell 22, in which a motor 2 is provided. An output shaft 21 of the motor 2 is transmissively connected to a screw rod 1 via a gear system, and thus the screw rod 1 is rotated with the output shaft 21. As shown in FIG. 2, the gear system is supported on the gear seat 3, and the screw rod 1 extends through the gear seat 3 and is connected to a valve rod 6. As the screw rod 1 is rotated, the valve rod 6 is axially moved upwardly or downwardly, thus adjusting the open degree of a valve opening in the valve seat 4, and adjusting the flow of the refrigerant.

As shown in FIG. 2, based on the above prior art, the gear seat 3 is further provided in a valve cavity of the valve seat 4, and an upper end of the valve seat 4 is further connected with a lower end of the motor shell 22. Specifically, the upper end of the valve seat 4 needs to be hermetically connected to the lower end of the motor shell 22. Compared with the prior art, since the gear seat 3 is further provided in the inner cavity of the valve seat 4 and the upper end of the valve seat 4 is hermetically connected to the lower end of the motor shell 22, there is one sealed part in such a structure. The less the number of the sealed parts is, the lower the leakage probability is. Furthermore, in the invention, since the gear seat 3 is provided in the valve cavity, and the upper end of the valve seat 4 is connected to the lower end of the motor shell 22, the assembly structure in the invention is simplified as compared with the prior art.

It should be noted that, in the above embodiment, the valve seat 4 can have a detachable structure and includes a seat body 41, and a sleeve 42 provided on an upper end of the seat body 41. An upper end of the sleeve 42 is further connected to the lower end of the motor shell 22, and the gear seat 3 is further provided inside the sleeve 42. The valve seat 4 includes a seat body 41 and a sleeve 42, which makes manufacture of the valve seat 4 simplified. Of course, the valve seat 4 may have an integral structure, that is, the seat body 41 and the sleeve 42 are integrally formed into one piece.

Figure 3:
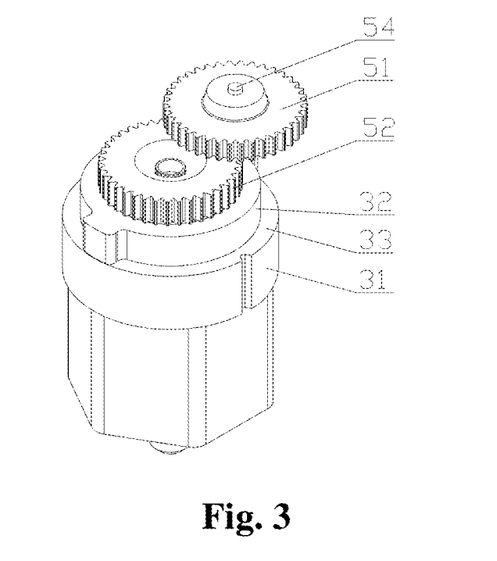
FIG. 3 is a schematic assembly view of a gear system and a gear seat of the electronic expansion valve in FIG. 2.
Figure 4:
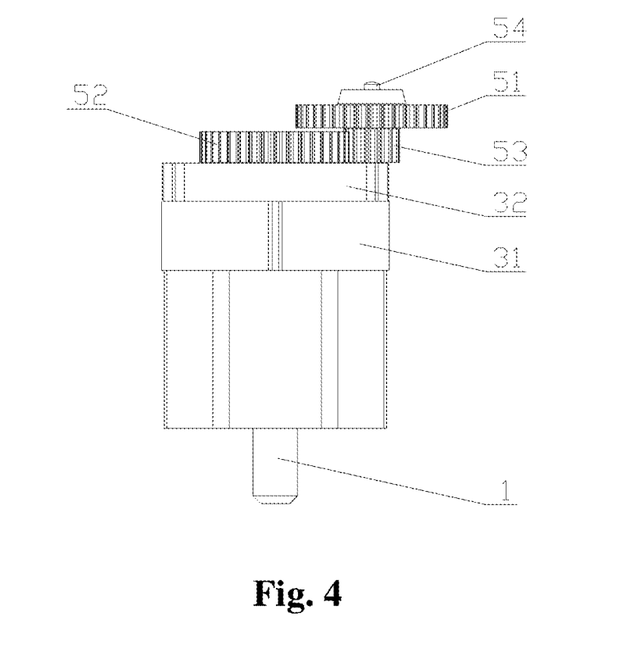
FIG. 4 is another schematic assembly view the gear system and the gear seat in FIG. 3.
Figure 5:
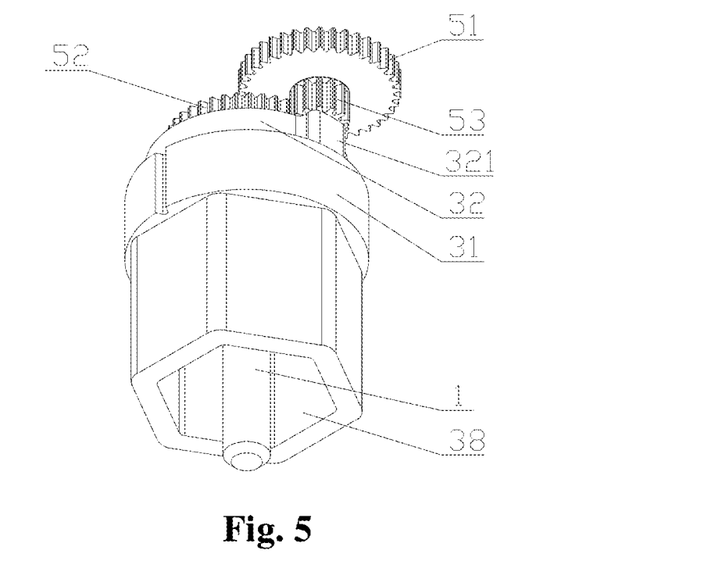
FIG. 5 is a front view showing an assembly structure of the gear system and the gear seat in FIG. 3.
Figure 6:
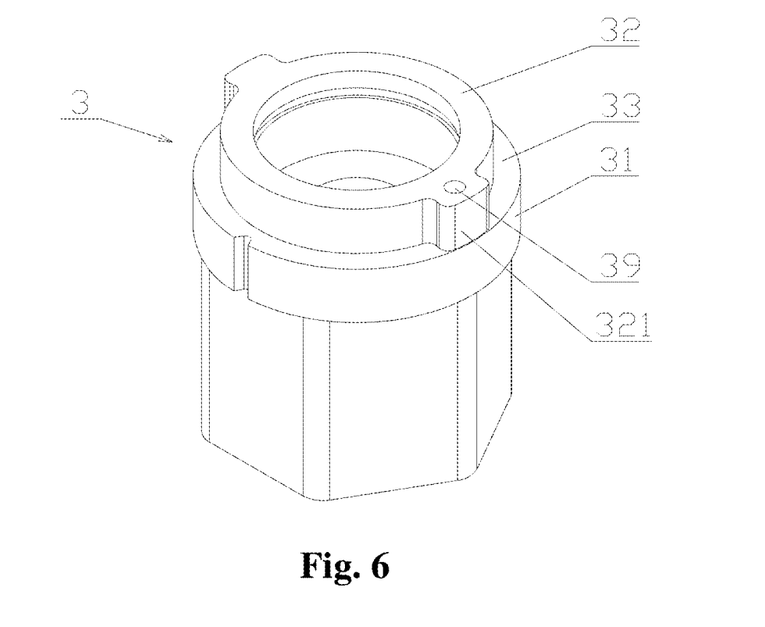
FIG. 6 is a structural schematic view of the gear seat in FIG. 3.
Figure 7:
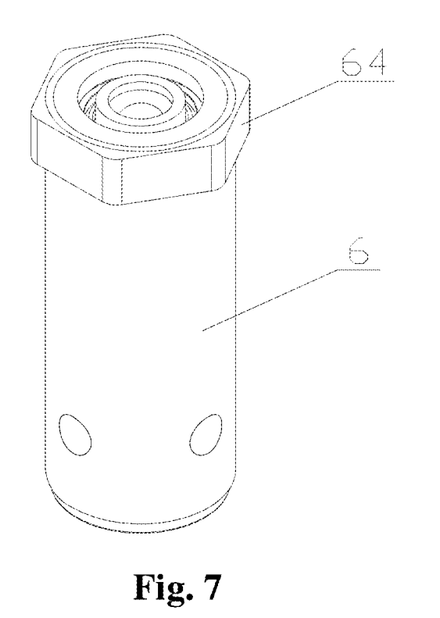
FIG. 7 is a structural schematic view of a valve rod fitted with the gear seat in FIG. 6.

Referring to FIGS. 3 to 7, FIG. 3 is a schematic assembly view of a gear system and a gear seat of the electronic expansion valve in FIG. 2; FIG. 4 is another schematic assembly view of the gear system and the gear seat in FIG. 3; FIG. 5 is a front view showing an assembly structure of the gear system and the gear seat in FIG. 3; FIG. 6 is a structural schematic view of the gear seat in FIG. 3; and FIG. 7 is a schematic view of a valve rod fitted with the gear seat in FIG. 6.

As shown in FIG. 2, the sleeve 42 includes a sleeve body part 421 and a sleeve bending part 422 bending towards outside. The sleeve body part 421 is connected to the seat body 41. The sleeve bending part 422 is connected to the lower end of the motor shell 22. As shown in FIGS. 3, 5 and 6, the gear seat 3 is circumferentially provided with a connecting part 31. As shown in FIG. 2, the connecting part 31 can further be connected to a circumferential inner wall of the sleeve body part 421. With the presence of the sleeve bending part 422, on the one hand, it is easy to connect the sleeve 42 and the lower end of the motor shell 22, and on the other hand, there is a sufficient space for installing the gear system, so as to facilitate the installation of the gear system. Furthermore, a larger space formed by the sleeve bending part 422 facilitates connection between the connecting part 31 and the circumferential inner wall of the sleeve body part 421.

Specifically, the structure of the gear seat 3 can be further improved. For example, as shown in FIGS. 3 and 6, a supporting part 32 with a smaller outer diameter is further provided above the connecting part 31, and the gear system is supported on the supporting part 32. Moreover, a circumferential side surface of the supporting part 32 and an upper end surface of the connecting part 31 form a step 33. The step 33 further provides a suitable space for the connection between the connecting part 31 and the circumferential inner wall of the sleeve body part 421. For example, the connection between the connecting part 31 and the circumferential inner wall of the sleeve body part 421 can be implemented in such a suitable space by welding such as soldering or laser welding.

It should be noted that, as shown in FIGS. 3, 4 and 5, the gear system includes a first gear 51, a second gear 52 and a transmission gear 53. The first gear 51 is engaged with a gear on the output shaft 21 of the motor 2. The second gear 52 is connected to the screw rod 1, and is provided in an upper cavity of the gear seat 3. The transmission gear 53 is engaged with the second gear 52. The transmission gear 53 and the first gear 51 share a positioning shaft 54, and thus the transmission gear 53 can transmit motion of the first gear 51 to the second gear 52. As shown in FIG. 2, the transmission gear 53 is further provided with a positioning shaft 54 fixedly connected to the supporting part 32 of the gear seat 3. With such a structure design, connection between the gear system and the gear seat 3 is conveniently implemented, and the structure is simpler and the cost is lower.

Furthermore, as shown in FIGS. 3 and 6, the supporting part 32 is provided with a protruding part 321 which radially protrudes out of the circumferential side surface of the supporting part 32. The protruding part is provided with a positioning hole 39. The lower end of the positioning shaft 54 is further connected in the positioning hole 39. With such a structure design, on the one hand, connection between the positioning shaft 54 and the supporting part 32 can be achieved, and on the other hand, a step 33 can be formed between the supporting part 32 and the connecting part 31.

As shown in FIG. 2, in any of the above technical solutions, the sleeve body part 421 is mounted outside the upper end of the seat body 41, and based on this, a lower end face of the gear seat 3 is further supported on an upper end face of the seat body 41. The gear seat 3 is further supported and fixed by the seat body 41, thus further improving stability of limit in axial direction of the gear seat 3.

Figure 8:
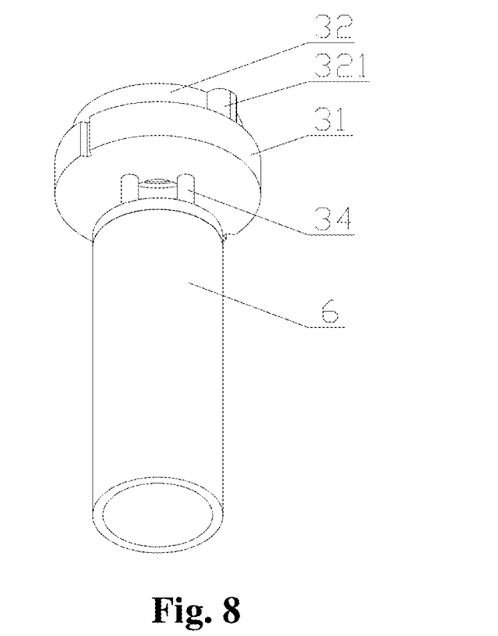
FIG. 8 is a schematic assembly view of a gear seat and a valve rod in another embodiment of the invention.
Figure 81:
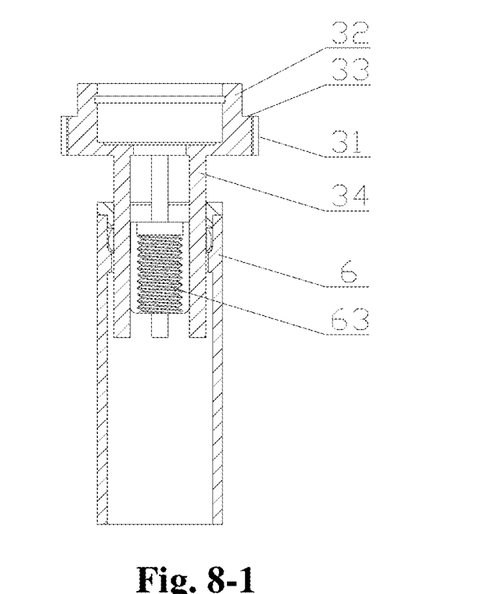

Additionally, referring to FIGS. 8 to 9-2, based on any of the above technical solutions, a further improvement can be made. For example, one of the gear seat 3 and the valve rod 6 in the invention is provided with a limit recess, and the other is provided with a limit protruding part which can axially slide in the limit recess. The limit protruding part is provided in the limit recess, so as to limit a position of the valve rod 6 relative to the gear seat 3 in circumferential direction.

In the invention, since a limit structure is not formed between the gear seat 3 and the nut 63, but formed between the gear seat 3 and the valve rod 6, the nut 63 can be provided inside the valve rod 6 in such a structure. Compared with a structure design of the prior art in which a nut extends from a valve rod, the axial dimension of a valve core component formed of the valve rod 6 and the nut 63 can be significantly reduced, thereby reducing the axial dimension of the valve body. Furthermore, since the nut 63 can be provided inside the valve rod 6, and the outline dimension of the valve core component is determined by the valve rod 6, the structure of the valve core component having a large lower portion and a small upper portion in the prior art may be avoided, so that manufacturing process of the gear seat 3 fitted with the valve rod 6 is simplified, and so that the assembly structure of the gear seat 3, the valve rod 6 and the valve seat 4 is simplified.

It should be noted that, in the above technical solution, structures of the limit protruding part and the limit recess between the gear seat 3 and the valve rod 6 are not limited. Any of engagement structures between the limit protruding part and the limit recess, which can allow the valve rod 6 to slide along the axial direction of the gear seat 3 upwardly or downwardly and can fix the valve rod 6 circumferentially relative to the gear seat 3, is intended to fall within the scope of protection of the invention.

Specifically, as shown in FIG. 5, the gear seat 3 is provided with the limit recess, and the limit recess is a non-circular irregular recess 38. As shown in FIG. 7, the valve rod 6 is provided with the limit protruding part, and the limit protruding part is a non-circular irregular part 64. An outer contour of the non-circular irregular part 64 is in conformity with an inner contour of the non-circular irregular recess 38, and the non-circular irregular part 64 is inserted into the non-circular irregular recess 38. With such a structure, the valve rod 6 can axially slide and be circumferentially limited easily.

It is noted that the non-circular irregular part 64 and the non-circular irregular recess 38 are not limited to be hexagonal as shown. Apparently, except for circle, any shape that can limit circumferential rotation of the valve rod 6 should fall within the scope of protection of the invention.

Specifically, the limit structure between the gear seat 3 and the valve rod 6 can be further designed. For example, referring to FIGS. 8, 8-1, 8-2 and 8-3, the limit protruding part is a first limit rod member 34 provided on one of the gear seat 3 and the valve rod 6, and the limit recess is a first limit hole 61 provided in the other one of the gear seat 3 and the valve rod 6. The first limit rod member 34 can be provided in the first limit hole 61 in such a manner as to be slidable axially. Apparently, with such a structure design, the valve rod 6 can axially slide and can be circumferentially limited. Since in such a structure, a fit structure between the rod and the hole is adopted, the material cost is significantly reduced as compared with the limit structure in FIGS. 3 to 7.

Figure 82:
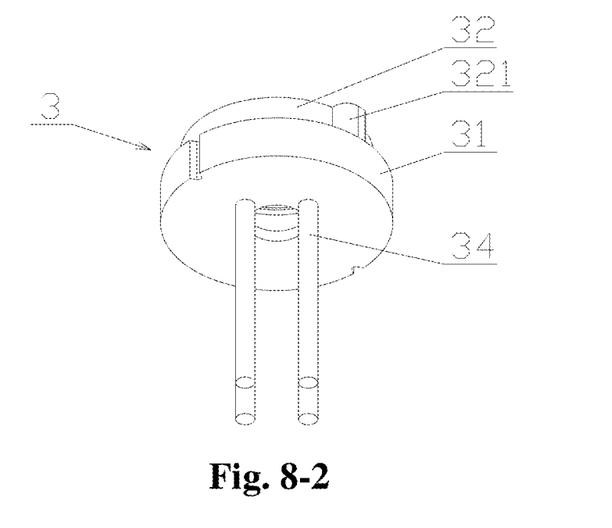
Figure 83:
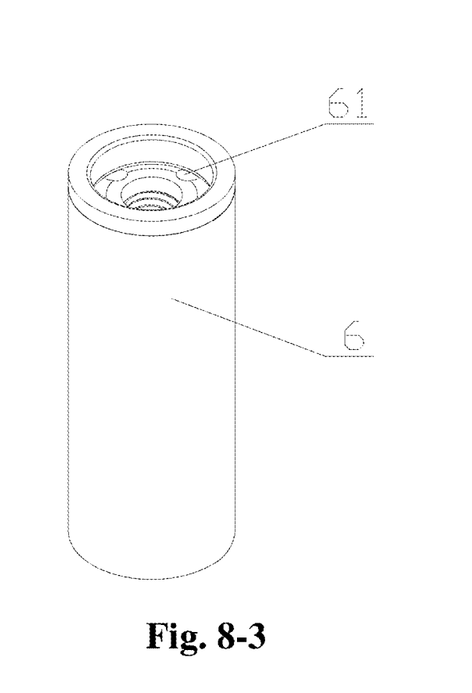

Specifically, as shown in FIG. 8-2, the gear seat 3 is provided with a first limit rod member 34 which is provided on a lower end face of the gear seat 3. Such a structure is simple and has a low manufacturing cost. As shown in FIG. 8-3, the valve rod 6 is provided with a first limit hole 61, and a nut 63 engaged with the screw rod 1 is provided inside the valve rod 6, with the first limit hole 61 being provided on the nut 63. With such a structure design, the first limit hole 61 and the nut 63 are integrally formed, thus simplifying the structure.

Further, the first limit rod member 34 can be a cylindrical rod member, and the first limit hole 61 can be a cylindrical hole. Based on this, the number of the first limit rod member 34 is the same as that of the first limit hole 61, which is at least two. The first limit rod members 34 and the first limit holes 61 are correspondingly arranged.

It is noted that, if the first limit rod member 34 is a non-circular irregular rod and the first limit hole 61 is a non-circular irregular hole corresponding to the first limit rod member 34, the number of the first limit rod member 34 and the number of the first limit hole 61 each can be one. Of course, to ensure circumferential limit strength, multiple first limit rod members 34 and multiple first limit holes 61 are preferably provided and are evenly distributed in circumferential direction.

Specifically, the limit structure between the gear seat 3 and the valve rod 6 can be further designed. For example, referring to FIGS. 9-1 and 9-2, the gear seat 3 is provided with a lower cavity 36, into which the upper end of the valve rod 6 extends. The limit protruding part is a second limit rod member 62 radially provided on one of a side wall of the lower cavity 36 and a side wall of the valve rod 6. The limit recess is a second limit hole 35 radially provided in the other one of the side wall of the lower cavity 36 and the side wall of the valve rod 6. Apparently, with such a structure design, the valve 6 also can slide axially and be limited circumferentially. Compared with the limit structure in FIGS. 3 to 7, such a structure is simpler and has a lower manufacturing cost.

Figure 91:
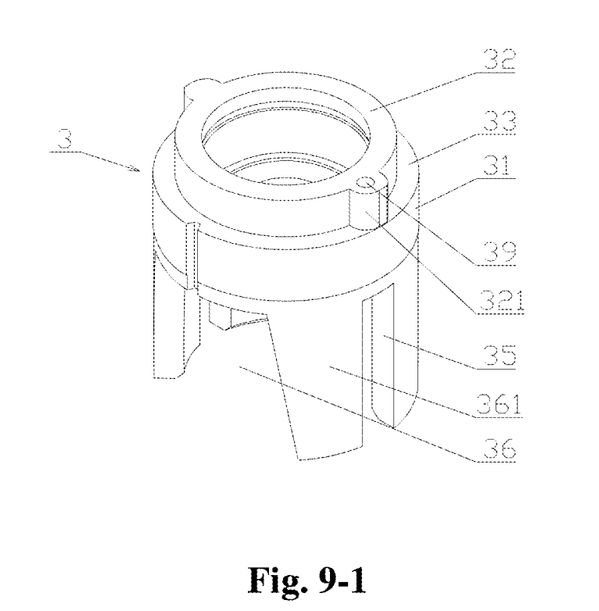
Figure 92:
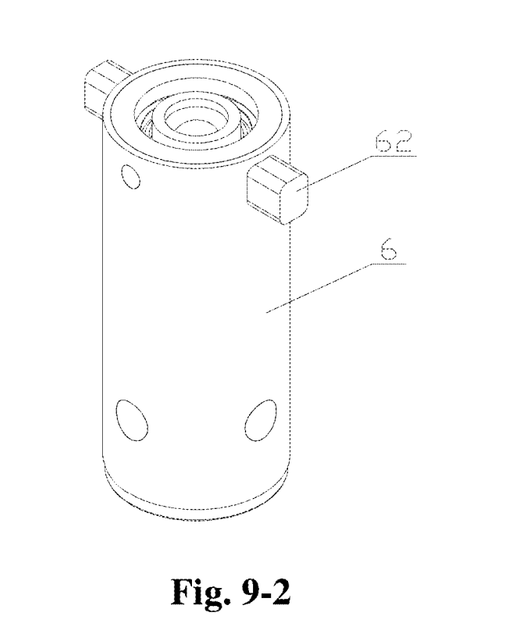

Specifically, as shown in FIGS. 9-1 to 9-2, a second limit rod member 62 may be provided on the side wall of the valve rod 6, and a second limit hole 35 may be provided in the side wall of the lower cavity 36, with the second limit hole 35 radially extending through the side wall of the lower cavity 36. Further, the second limit hole 35 axially extends through the lower end face of the gear seat 3. With such a structure design, manufacturing process of the second limit rod member 62 and the second limit hole 35 can be simplified, thus further reducing the manufacturing cost.

Furthermore, to reduce material cost, as shown in FIG. 11, the side wall of the lower cavity 36 can be of an interrupted structure including at least one interrupted part 361, and the second limit hole 35 is provided in the interrupted part 361.

Figure 101:
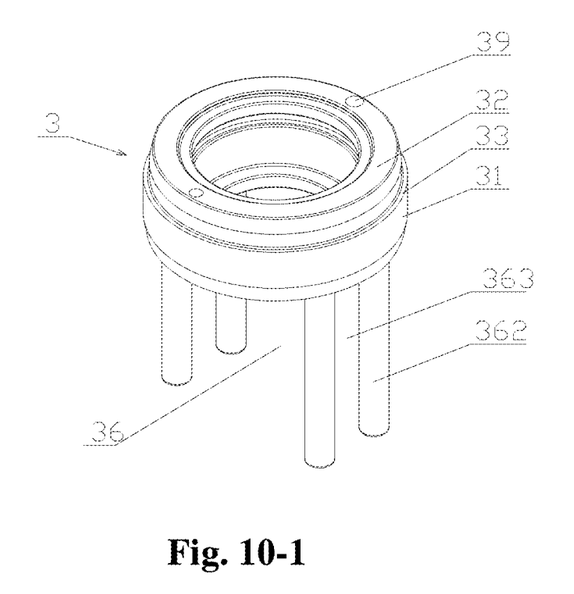
Figure 102:
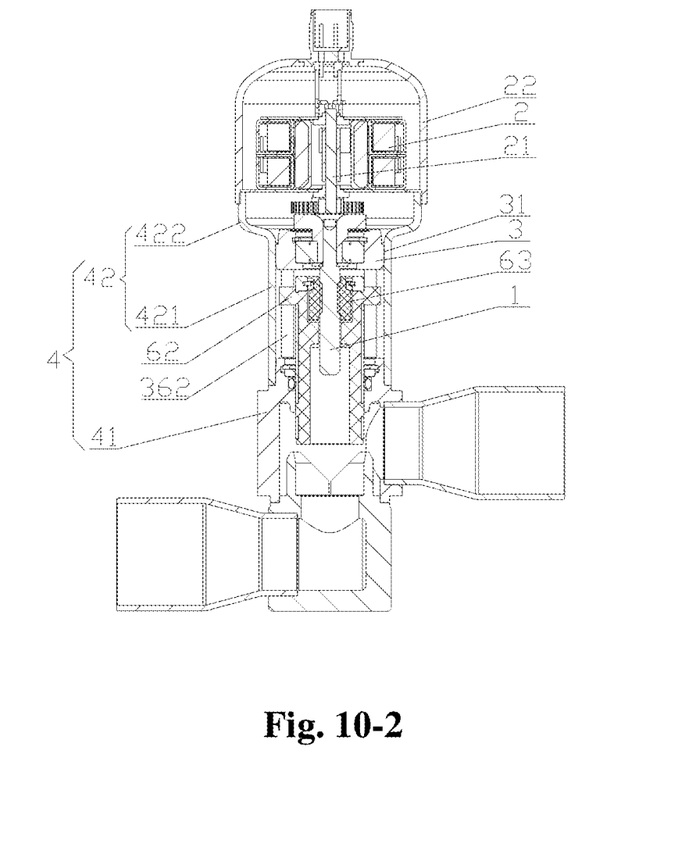

Referring to FIGS. 10-1 and 10-2, FIG. 10-1 is a structural schematic view of a gear seat in a further embodiment of the invention; and FIG. 10-2 is a structural schematic view of an electronic expansion valve including the gear seat in FIG. 10-1.

The gear seat 3 can be further improved. For example, as shown in FIG. 10-1, the gear seat 3 is circumferentially provided with multiple positioning rod members 362 extending axially. A lower cavity 36 is circumferentially surrounded by the positioning rod members 362, and the upper end of the valve rod 6 extends into the lower cavity 36. Among the positioning rod members 362, a gap between at least one pair of adjacent positioning rod members 362 serves as a limit gap 363, and the limit recess is formed by the limit gap 363. The limit protruding part is a second limit rod member 62 provided on the side wall of the valve rod 6. As shown in FIG. 10-2, the second limit rod member 62 is inserted into the limit gap 363.

As shown in FIG. 10-1, four positioning members are provided, and two limit gaps 363 are each formed between two positioning members. Also as shown in FIG. 10-2, the second limit rod member 62 is inserted into the limit gap 363. Apparently, with such a structure design, the valve rod 6 can axially slide and can be circumferentially limited, thus further reducing material cost and simplifying the structure.

Hereinbefore, the electronic expansion valve according to the invention is described in detail. Specific examples are used herein to describe the principle and the implementation of the invention. The description of the above embodiments is only used to help understanding the method of the invention and the core idea thereof. It should be noted that several modifications and improvements can be made in the invention by those skilled in the art without departing from the principle of the invention, and these modifications and improvements should be considered as falling within the scope of protection of the invention claimed in claims.

The invention claimed is:

1. An electronic expansion valve, comprising a screw rod, and a motor provided with an output shaft, wherein
the output shaft is transmissively connected to the screw rod via a gear system, the gear system is supported on a gear seat, and the screw rod extends through the gear seat;
the electronic expansion valve further comprises a valve seat provided with a valve cavity, and a motor shell provided outside the motor,
the gear seat is further provided in the valve cavity, and an upper end of the valve seat is further connected to a lower end of the motor shell;

the screw rod extends through the gear seat and is connected to a valve rod;

one of the gear seat and the valve rod is provided with a limit recess, and the other one of the gear seat and the valve rod is provided with a limit protruding part axially slidable in the limit recess;

the limit protruding part is provided in the limit recess so as to limit a position of the valve rod relative to the gear seat in a circumferential direction;

the gear seat is provided with a plurality of positioning rod members extending axially, a lower cavity is circumferentially defined by the plurality of positioning rod members, and the upper end of the valve rod extends into the lower cavity;

the limit protruding part is a second limit rod member provided on the side wall of the valve rod;

among the plurality of positioning rod members, a gap between at least one group of adjacent positioning rod members serves as a limit gap, and the limit recess is formed by the limit gap; and the second limit rod member is inserted in the limit gap.

2. The electronic expansion valve according to claim 1, wherein the valve seat comprises a seat body, and a sleeve provided on an upper end of the seat body, and an upper end of the sleeve is further connected to the lower end of the motor shell, and the gear seat is further provided inside the sleeve.

3. The electronic expansion valve according to claim 2, wherein the sleeve comprises a sleeve body part, and a sleeve bending part bending towards outside, and the sleeve body part is connected to the seat body, the sleeve bending part is connected to the lower end of the motor shell; and the gear seat is circumferentially provided with a connecting part, and the connecting part is connected to a circumferential inner wall of the sleeve body part.

4. The electronic expansion valve according to claim 3, wherein a supporting part with an outer diameter smaller than an outer diameter of the connecting part is further provided above the connecting part, and the gear system is supported on the supporting part.

5. The electronic expansion valve according to claim 4, wherein the gear system comprises a first gear connected to the output shaft, a second gear connected to the screw rod, and a transmission gear for transmitting motion of the first gear to the second gear; and the transmission gear is provided with a positioning shaft, and a lower end of the positioning shaft is further connected to the supporting part.

6. The electronic expansion valve according to claim 5, wherein the supporting part is provided with a protruding part radially protruding out of a circumferential side surface of the supporting part, and the lower end of the positioning shaft is further connected to the protruding part.

7. The electronic expansion valve according to claim 2, wherein a lower end face of the gear seat is further supported on an upper end face of the seat body.

\* \* \* \* \*